(12) United States Patent
Herbst et al.

(10) Patent No.: US 6,910,054 B1
(45) Date of Patent: Jun. 21, 2005

(54) METHODS, SYSTEMS AND COMPUTER PROGRAM PRODUCTS FOR STORING DATA USING A ROLLING WINDOW FILE

(75) Inventors: Joseph Martin Herbst, Cary, NC (US); Joel Mark Yarborough, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 09/375,071

(22) Filed: Aug. 16, 1999

(51) Int. Cl.⁷ .............................................. G06F 17/30
(52) U.S. Cl. ........................................ 707/205; 707/3
(58) Field of Search ................................ 707/200–206, 707/8, 10, 3, 1; 714/4; 710/53, 200; 345/302, 335, 536

(56) References Cited

U.S. PATENT DOCUMENTS

| | | | | |
|---|---|---|---|---|
| 5,333,311 A | * | 7/1994 | Whipple, II ................. | 707/205 |
| 5,371,885 A | * | 12/1994 | Letwin .......................... | 707/205 |
| 5,398,337 A | * | 3/1995 | Ito .................................. | 707/8 |
| 5,422,762 A | | 6/1995 | Jerbic ........................... | 395/600 |
| 5,432,928 A | * | 7/1995 | Sherman ......................... | 707/3 |
| 5,598,370 A | | 1/1997 | Niijima et al. ............... | 395/601 |
| 5,608,901 A | * | 3/1997 | Letwin .......................... | 707/205 |
| 5,649,151 A | * | 7/1997 | Chu et al. .................... | 711/111 |
| 5,675,769 A | | 10/1997 | Ruff et al. ................. | 395/497.4 |
| 5,710,919 A | * | 1/1998 | Rail .............................. | 707/100 |
| 5,764,972 A | * | 6/1998 | Crouse et al. .................. | 707/1 |
| 5,832,526 A | * | 11/1998 | Schuyler ....................... | 707/200 |
| 5,873,118 A | | 2/1999 | Letwin ......................... | 711/156 |
| 5,960,446 A | * | 9/1999 | Schmuck et al. ............ | 707/205 |
| 6,216,125 B1 | * | 4/2001 | Johnson ......................... | 705/52 |
| 6,298,474 B1 | * | 10/2001 | Blowers et al. ............... | 700/83 |

* cited by examiner

*Primary Examiner*—Mohammad Ali
(74) *Attorney, Agent, or Firm*—Jeanine S. Ray-Yarletts

(57) ABSTRACT

Methods, systems and computer program products for storing data that use a rolling window file that maintains a defined file size while sequentially replacing an oldest portion of previously stored data with new data are provided. The rolling window file operates without the use of a wrap buffer implemented through manipulation of a current offset pointer by moving a first storage region in a sequentially linked plurality of storage regions associated with the rolling window file to become the new last (or end of file) storage region associated with the file. Newly received data may then be stored in the newly designated end of file storage region. Operations moving the first region in the linked sequence to the last position can repeat theoretically indefinitely as new data is received. Accordingly, a fixed file length saving only the most recent data may be provided without ever reallocating the regions, such as clusters of data under a file access table type file systems, that are originally associated with the rolling window file.

26 Claims, 5 Drawing Sheets

FIG. 2

| Name/Extension 72 | Attribute 74 | Reserved 76 | Type 78 | Time/Date 80 | Pointer 82 | Size 84 |

| Region 00 | Region 01 | Region 02 | Region 03 | Region 04 | Region 05 | Region 06 | Region 07 |
| F8FF | FFFF | 0004 | nnnn | 0007 | nnnn | nnnn | FFFF |

92 94 96 98 100 102 104 106 108 110

METHODS, SYSTEMS AND COMPUTER PROGRAM PRODUCTS FOR STORING DATA USING A ROLLING WINDOW FILE

FIELD OF THE INVENTION

The present invention relates to file management and, in particular, to data storage in files.

BACKGROUND OF THE INVENTION

Computer systems typically include a central processing unit, various types of memory and a variety of peripheral devices including input/output devices and nonvolatile data storage devices such as removable media, including floppy disk drives, and fixed storage including disk drives and tape drives. Communication between the various peripheral devices and the central processing unit is typically controlled by a computer operating system. For example, well known computer operating systems currently used in personal computers include MS-DOS and Windows available from Microsoft Corporation. Under operating systems such as the MS-DOS operating system, a single file system controls the organization of files stored on peripheral devices.

In order for the computer system to read or write data in a format recognized by both the computer system and the respective peripheral devices, data typically must be organized in accordance with the file system management aspect of the operating system. One such file system is known as the File Allocation Table (FAT) file system. The FAT file system provided with the MS-DOS operating system is one of the most widely used file systems currently in use although other file systems may be associated with other types of data storage devices or operating systems. For example, an alternative file system is the High Performance File System (HPFS) which is described in U.S. Pat. No. 5,371,885.

File systems facilitate communication between the operating system kernel and device dependent drivers. The file systems are typically responsible for operations such as converting read and write commands generated by an operating system kernel into a form which may be supported by the particular device dependent drivers. The file system may further be responsible for the allocation of disk space for a file on a device such as a hard disk drive.

The allocation of disk space is typically done only on an as needed basis. That is, the disk space is not pre-allocated but is instead allocated one cluster (unit of allocation) at a time. Typically, a cluster in a FAT type file system is one or more consecutive disk sectors. The clusters for a file are linked (chained) together and, typically, kept track of by entries in a file allocation table. In addition to the file allocation table, a directory is typically maintained containing a directory record for each file. Some designated size portion of the peripheral hard disk device is generally established for the file allocation table and the directory at the point of initialization of the disk.

To locate all of the data that is associated with a particular file stored on the hard disk drive, the starting cluster number of the file is obtained from the file's directory entry, then the file allocation table is referenced to locate the next sequential cluster associated with the file. In other words, the file allocation table is typically provided as a linked list of cluster pointers so that each file allocation entry for a file points to the next sequential cluster used for that file. Under the MS-DOS FAT file system, each entry in the file allocation table is typically a 16 bit value. Furthermore, the last entry for a file in the file allocation table is typically assigned a number designating that entry as the end of file cluster (i.e., indicating that no more clusters follow). The end of file designation number typically ranges from FFF8 to FFFF (base 16) inclusive.

The size of a cluster under the file system is typically defined at the time when the hard disk is formatted and usually ranges from about 1 to about 128 sectors. Using a 16 bit file allocation table format, each sector of a file allocation table can point to up to 256 clusters and a corresponding multiple number of sectors on the disk drive depending upon the size of a cluster at the time of initialization.

One particularly problematic file management application involves the collection of high speed or bursty data into a file to provide a permanent record of the data. Examples of applications which may generate such high speed data storage demands include debugging operations such as network traces or software execution traces and other application level programs such as video data collection for a digital security system. In these types of applications, there are typically two, sometimes conflicting, considerations. The first decision that must be addressed is how much of the data is to be saved. Depending upon the amount of data collected or the time over which the collection occurs, it may not always be feasible to save all of the data up to a point of interest. For example, a two day trace on a busy network could fill thousands of megabytes of memory. Even if there was sufficient hard disk space available for storing all such data, in all likelihood, the analysis of this volume of data would be impractical. The second issue is to determine the degree to which the data collection process interferes with the performance of the computer system. File operations, such as save operations, generally tend to be demanding of computer system resources while at the same time the application is generating high speed data streams from data collection operations. Such data collection applications tend to be intolerant of interruption due to computer system conflicts or resource limitations. Various current approaches to limiting the size of a data collection file potentially impose undesirable delays on operations when high speed data is being collected.

One solution which has previously been proposed to the problem of high speed data collection is to create a fixed size output file and treat it as a wrap buffer by managing the current offset pointer of the file system. Under this approach, for example, an application program may manage its own file offset pointer to track the filling and wrapping of the output file as data accumulates. The application program would typically have to perform an expensive file seek operation to reset the file offset pointer back to the beginning of the file each time the file wraps due to data overflow. Additionally, depending on synchronization issues in the particular implementation the application may also need to perform a file seek operation before every file write, effectively doubling the problematic performance overhead of the file operations. Finally, the application program would generally need to preserve an accurate copy of the current file offset in the file itself so that parsing routines will be able to find and parse the beginning of the data at a later time.

To ensure that there is always an accurate copy of the file offset within the file itself, the offset value should also be updated on each write, again doubling the file operation overhead to seek to the offset storage location, write the current offset for later use, then seek back to the next write location. It should also be noted that every application program reading or writing the file would be expected to duplicate this logic and to have a common understanding of the file format to know where to get/save, among other things, the working file offset. This approach may be inconvenient to implement as it requires additional processing for both the collection and post-processing phases and further requires additional formatting information to be stored in the file. In addition, the file seek time to manipulating the current offset pointer may be burdensome.

Another alternative approach is to re-create the file after it fills all of its allocated disk space. Such an approach involves truncating the front of the file when a fill threshold is reached. However, this approach also generally requires creating a new file, copying the later saved portion of the original file to the new file and then renaming the newly created file to the previous file name. This approach is expected to be very burdensome and not appropriate for high performance systems.

SUMMARY OF THE INVENTION

Accordingly, it is an object of the present invention to provide methods, systems and computer program products which may provide for storing of data while discarding old data to maintain a limited file size.

It is a further object of the present invention to provide such methods, systems and computer program products which may reduce the burden on an application program utilizing the present invention to store data.

These and other objects may be provided, according to the present invention, by methods, systems and computer program products for storing data that use a rolling window file that maintains a defined file size while sequentially replacing an oldest portion of previously stored data with new data. The rolling window file operates without the use of a wrap buffer implemented through manipulation of a current offset pointer by moving a first storage region in a sequentially linked plurality of storage regions associated with the rolling window file to become the new last (or end of file) storage region associated with the file. Newly received data may then be stored in the newly designated end of file storage region. Operations moving the first region in the linked sequence to the last position can repeat theoretically indefinitely as new data is received. Accordingly, a fixed file length saving only the most recent data may be provided without ever reallocating the regions, such as clusters of data under a file access table type file systems, that are originally associated with the rolling window file.

In one embodiment of the present invention, a method for storing data in a file is provided. A defined number of storage regions are associated with the file including a first region and an end of file region. Data is stored in the associated storage regions to provide an unused size of the file corresponding to a portion of the associated storage regions not containing data. When additional data is received, the first region is redesignated as a new end of file region and at least a portion of the additional data is stored in the new end of file region. The additional data received may be an amount of data exceeding the unused size of the file. The above operations may be preceded by determining if the file is designated as a rolling window type file.

In another embodiment of the present invention, the storage regions may be associated with the file by creating a directory record associated with the file and updating the directory record to indicate that the file is a rolling window type file. The data may be stored in the associated storage regions sequentially from the first region through the end of file region. Furthermore, in addition to redesignating the first region, a second region in the associated storage regions, which second region sequentially follows the first region, is redesignated as a new first region. Operations in one embodiment continue with the receipt of further additional data after which the new first region is redesignated as a second new end of file region and a third region in the associated storage regions, which third region sequentially follows the new first region, is redesignated as a second new first region. The further additional data is then stored in the second new end of file region.

In a further embodiment of the present invention, redesignating operations for the first region include updating the directory record associated with the file to replace a pointer designating the first region with a pointer designating the new first region. Furthermore, the file allocation table is updated to replace an end of file indication in the end of file region with a pointer to the new end of file region and to place an end of file indication in the new end of file region.

In a further aspect of the present invention, a method is provided for storing data in a rolling window file including a defined number of sequentially associated storage regions from a first region through an end of file region, the end of file region having an unused size. The method includes receiving an amount of data for storage in the rolling window file which exceeds the unused size of the end of file region. The first region is redesignated as a new end of file region and a second region in the associated storage regions, which second region sequentially follows the first region, is redesignated as a new first region. The received data is then stored in the new end of file region. Operations repeat moving the new first region to become a second new end of file region for the next receipt of data for storage which exceeds an unused size of the new end of file region. In one embodiment, the rolling window file is a file type supported by a file system and the file system is a file allocation table based file system and the storage regions are clusters maintained by the file system.

While the invention has been described above primarily with respect to the method aspects of the invention, both systems and computer program products are also provided.

BRIEF DESCRIPTION OF THE DRAWINGS

FIG. 2 is a schematic diagram of a directory record according to an embodiment of the present invention;

FIG. 3 is a schematic diagram of a portion of a file allocation table according to an embodiment of the present invention;

DETAILED DESCRIPTION OF PREFERRED EMBODIMENTS

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

Figure 1:
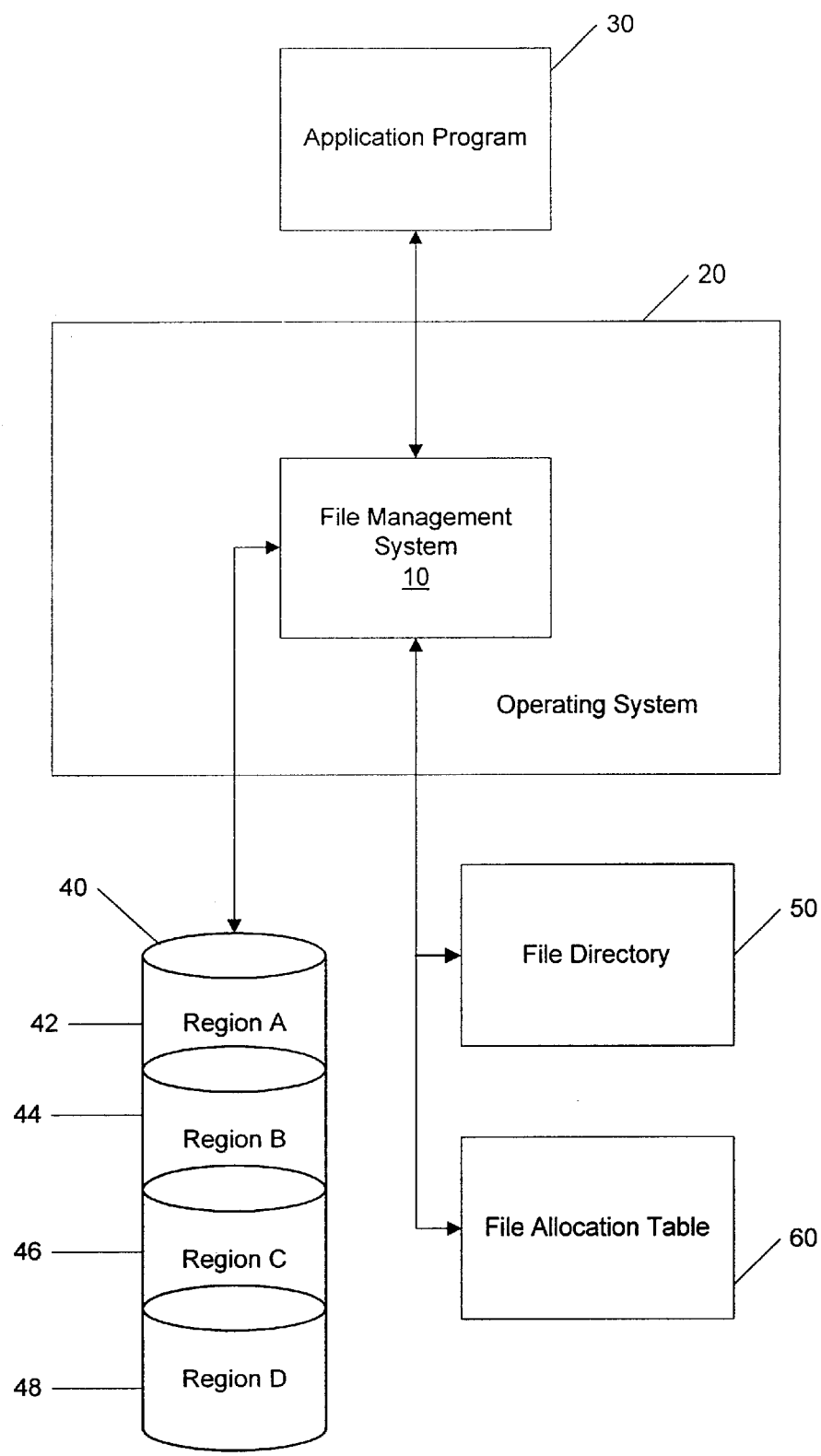
FIG. 1 is a schematic diagram of a computer system including a file management system according to an embodiment of the present invention.

FIG. 1 schematically illustrates a computer system including a rolling window file based system for storing data according to an embodiment of the present invention. More particularly, the embodiment illustrated in FIG. 1 is an implementation of the present invention under a file allocation table type file system. For the sake of understanding the invention as described herein, the examples will generally be provided in the context of such file allocation table based systems. However, it is to be understood that the methods, systems and computer program products of the present invention are suitable for use with other types of file systems which allocate incremental blocks of storage space to a file and sequentially link the allocated blocks of storage space.

Referring again to FIG. 1, a file management system 10 utilizing rolling window files is incorporated in operating system 20. The file management system 10 receives data for storage, such as high speed data collection results from an end-user application program 30. The data from application program 30 is stored by file management system 10 on a storage device 40. While the storage operations are illustrated in FIG. 1 as being directly managed by file management system 10, it is to be understood that device specific drivers supporting the storage device 40 may be incorporated in operating system 20, which device drivers may be utilized by file management system 10 to implement read and write operations for the storage device 40.

The storage device 40 may be a peripheral storage device such as a hard disk drive. Such devices suitable for use with the present invention typically are formatted in a sector format on a cylindrical storage media. Accordingly, various physical locations on the disk drive may be specified by an address designating a read/write head number, a cylinder number, and a sector number on the cylinder. The cylinder numbers may, in turn, be sequentially numbered from an innermost cylinder to an outermost cylinder on a cylindrical storage media. Each cylinder in turn may be broken into a plurality of sectors each defined by an arcuate portion of the cylinder. The head number, in turn, designates a specific surface. For example, on a single disk hard drive, the top head could be head zero and the bottom head may be designated head one. Multi-cylinder hard drives are known which provide for incrementing the head number progressively from platter to platter of the device.

This physical address system is further broken into logical storage increments by file management system 10. Under a file allocation table type file system, the logical storage increments are typically referred to as clusters. In the illustration of FIG. 1, four different regions (which may be one or more clusters as will be described further herein) A 42, B 44, C 46 and D 48 are illustrated. However, it is to be understood that a storage device 40, such as a hard drive, typically will include a much greater number of regions than those illustrated in FIG. 1. The number of regions illustrated in FIG. 1 is selected to facilitate the understanding of operations of the file management system 10 according to the present invention as will be explained further herein. It is also to be understood that, while the logical storage regions or clusters are unitized as illustrated in FIG. 1, they may actually be groupings of physical sector locations on the storage device 40 which are not contiguously located. Furthermore, it is to be understood that the present invention may be implemented in a network environment wherein the storage device 40 may be one or more physical devices communicatively connected to a network so as to be accessible to an application program 30 through an operating system 20.

The file management system 10 further interacts with file directory 50 and file allocation table 60. The file directory 50 and file allocation table 60 may, in fact, be located on designated sectors of the storage device 40 which are established at the time of initialization of the storage device 40. Sufficient storage space is preferably provided for the file directory 50 and the file allocation table 60 to support the full range of sizes and quantities of files required by the operating system 20. Furthermore, redundancy to account for potential defects in the storage device 40 may be provided by including duplicate copies of the file directory 50 and the file allocation table on the storage device 40.

Referring now to FIG. 2, an exemplary file directory record 70 suitable for use with the present invention will now be described. It is to be understood that the file management system 10 may, at any given time, be maintaining a plurality of rolling window files according to the teachings of the present invention to support operations by a plurality of application programs 30 generating data storage streams. Accordingly, the file directory 50 may include a plurality of file directory records 70 with each file directory record 70 being associated with a different file.

The directory record 70 illustrated in FIG. 2 includes a plurality of designated fields. The directory record 70 is preferably a fixed, predetermined length, for example, 32 bytes in length with each file being allocated a portion of the record length. The name of the file and its extension are stored in the name/extension field 72. The attribute field 74 defines an associated attribute for the file. The illustrated directory record 70 further includes a reserved field 76. Such reserved fields for future use are typically used in existing file allocation table type file systems.

Following the reserved field 76 in the directory record 70 of FIG. 2 is type field 78. The type field 78 is used according to the present invention to designate a particular file as a rolling window file. As will be described subsequently herein, data storage operations for rolling window files are processed differently from the ordinary procedures under known file allocation table type file systems.

The next field in the directory record 70 of FIG. 2 is the time/date field 80 which is provided to allow the file system to store time and date information associated with operations on the file associated with directory record 70. Also shown in FIG. 2 is a pointer field 82 which contains a pointer that points to an entry in the file allocation table 60 corresponding to the first region (or cluster) of sectors used to store data in the file associated with the directory record 70. Finally, the size field 84 specifies the size of the file associated with the directory record 70.

The name/extension field 72, attribute field 74, reserved field 76, time/date field 80 and size field 84 are known to those of skill in the art in connection with existing file allocation table based file systems. Accordingly, the operations and format of these fields will not be described further herein except with reference to their relation to operations according to the present invention. Furthermore, it is to be understood that the type field 78 may be implement in existing file systems by allocating a limited portion of the existing system's reserved field 76 to the type field. The present invention may, thereby, be implemented in existing file systems while utilizing as little as a single bit of an existing reserved field to designate a file for use as a rolling window file. The pointer field 82 further generally corresponds to the cluster pointer field of existing file allocation table based systems except as will be discussed herein.

FIG. 3 schematically illustrates a portion of a file allocation table 60 suitable for use with the present invention. The upper row 92 in FIG. 3 contains the region (or section) number of the file allocation table 60. The lower row 94 contains exemplary data entries suitable for use in describing operations according to various embodiments of the present invention. In the illustrated embodiment of FIG. 3, each region of the file allocation table 60 contains a two byte pair of data as shown in row 94.

The basic structure illustrated for the file allocation table in FIG. 3 is typical of that used by existing file allocation table based file systems. The first two regions, Region 00 96 and Region 01 98 are the beginning bytes of the file allocation table 60 and are typically used to track file information. Accordingly, the first region number within the file allocation table 60 associated with data storage is designated as Region 02 100. Region 02 100 of the file allocation table 60 corresponds to a first region (or cluster) of storage, such as physical disk sectors on the storage device 40, which are used to store data. The association of a particular region, such as Region 02 100 with a physical sector or group of physical sectors on the storage device 40 is managed by file management system 10 in cooperation with device drivers associated with the storage device 40 and is preferably established at the time of initialization of the storage device 40. Similarly, Regions 03–07 102–110 are associated with other physical sectors or groups of sectors of the storage device 40.

The file allocation table 60 provides for the sequentially linked association of a plurality of regions 100–110 with a specific file. For example, a file corresponding to the directory record 70 may contain a pointer field 82 value indicating that the first region within the file allocation table 60 associated with that file is Region 02 100. The file allocation table 60 may be, in turn, used to determine if any additional regions or clusters are used to store the information for the file associated with directory record 70. In the example of FIG. 3, Region 02 100 includes a cluster field 94 pointing to Region 04 104. Region 04 104, in turn, includes a cluster field 94 pointing to Region 07 110. Finally, Region 07 110 includes a cluster field 94 containing an FFFF entry indicating an end of file. Accordingly, based on the portion of the file allocation table 60 shown in FIG. 3, there are no additional regions associated with the file. In other words, Region 02 100 is the first region associated with the file, Region 04 104 is the second region and Region 07 110 is the end of file region associated with the file named in the directory record 70 and including a pointer field 82 pointing to Region 02 100 of the file allocation table 60.

Figure 4:
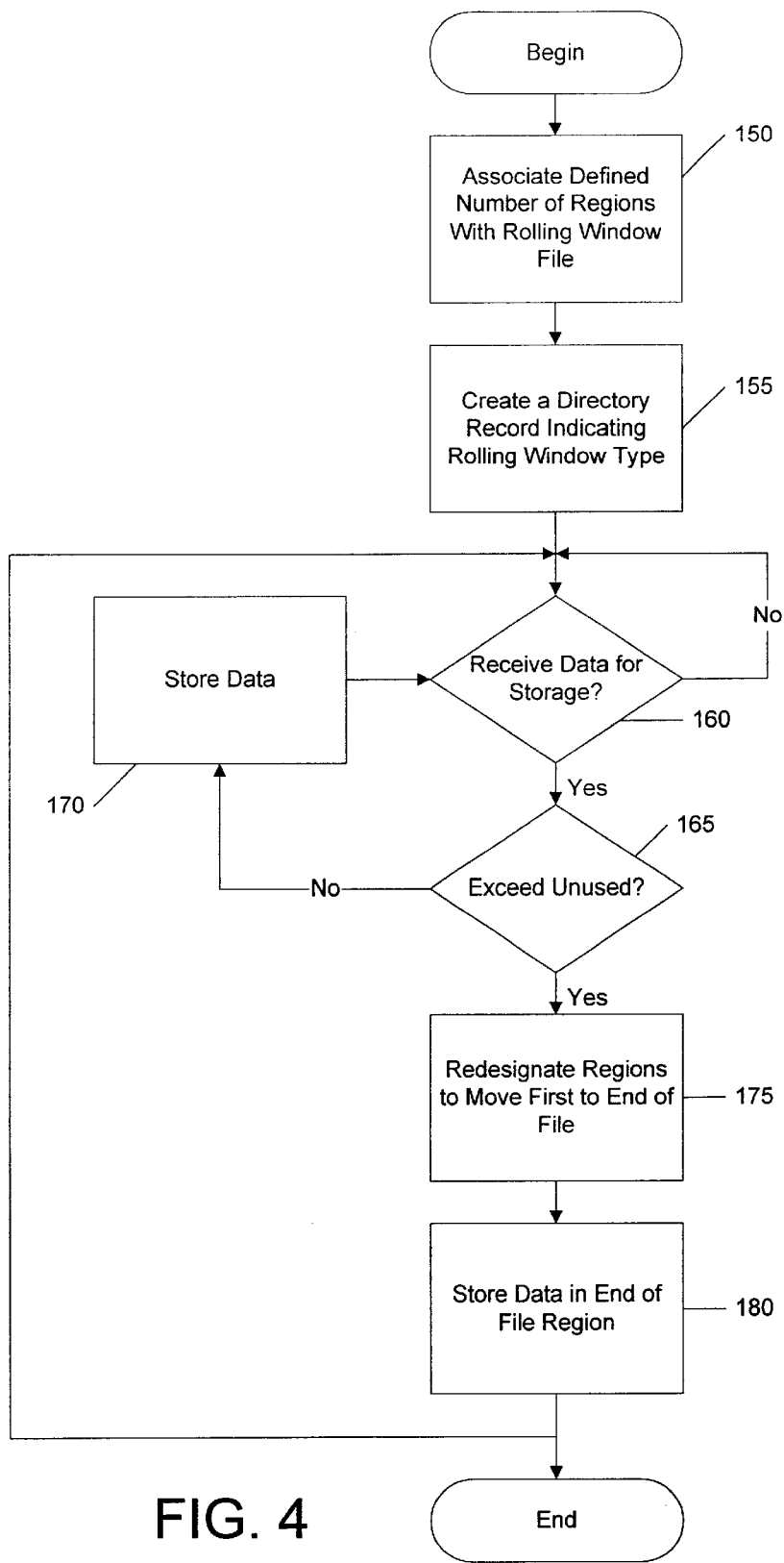
FIG. 4 is a flowchart illustrating operations for data storage according to an embodiment of the present invention.

Operations according to an embodiment of the present invention will now be further described with reference to the flowcharts of FIG. 4 and FIG. 5 and the schematic diagram of FIG. 6. Referring first to FIG. 4, operations begin at block 150 with the file management system 10 establishing a rolling window file to support a data stream from an application program 30 by associating a defined number of disk regions 42, 44, 46, 48 with the rolling window file including a first region and an end of file region. Preferably, in a file allocation table based file system environment, each "region," as that term is used herein, corresponds to a single cluster (or logical storage increment) under the existing file system structure. Each "region" as used herein, may, alternatively, correspond to a group of two or more clusters which will then be processed as a group according to the operations as described herein. Furthermore, a "region" may be a unit of storage on a variety of storage devices including ramdisks, network drives and other known types of storage devices. For the sake of simplicity and understanding of various aspects of the present invention, for the remainder of the description, a region will be assumed to correspond to a single cluster under the file management system. Furthermore, the number of regions initially assigned to the rolling window may be a minimal number of two or more with additional regions added later if desired up to, for example, a specified maximum number of regions. For purposes of the following description, it will be assumed that a fixed number of regions is provided at the time of creation of the rolling window file and the number of regions is not subsequently changed.

In addition to associating a defined number of disk regions with the file, a directory record 70 associated with the file is generated by the file management system 10 and included in the file directory 50 (block 155). The directory record 70 is updated by the file management system 10 to indicate that the file is a rolling window file. For example, with reference to the embodiment of the directory record 70 in FIG. 2, the type field 78 is set to indicate a rolling window file type.

After the rolling window file is created, an amount of data is received for storage in the rolling window file (block 160). If the received data does not exceed the unused space remaining in the regions associated with the file (block 165) operations proceed to block 170 and the data is stored, for example, using known techniques placing the data in the next sequential region allocated to the file at the location of the current offset pointer. If, however, the amount of data received for storage exceeds the unused size of the regions allocated to the rolling window file (block 165) the first region in the linked sequence of regions associated with the rolling window file is redesignated as a new end of file region thereby moving what was the first region in the link sequence to the last position (block 175). Operations at block 175 further include redesignating a second region in the associated disk regions for the rolling window file (which had previously been linked as the region sequentially following the old first region) as the new first region. Generally, the new amount of data received for storage exceeds the unused size of the file when the amount of data exceeds the unused size of the end of file region in the sequential group of associated regions.

Once the regions have been redesignated to remove the old first region, which had contained the oldest stored data, and make it the new end of file region, the received data is stored in the new end of file region which has been made available to accept new data (block 180). Of course, it is to be understood that the old data in the new end of file region is no longer retained once the space has been reallocated and freed up for collection of new data. Accordingly, new data may continue to be stored while maintaining a fixed maximum file size.

After the received data is stored at block 180, operations return to block 160 awaiting receipt of additional data for storage. When additional data is received for storage, operations repeat as described for blocks 165–180 with the first region on each iteration being shifted to become the end of file region.

Figure 5:
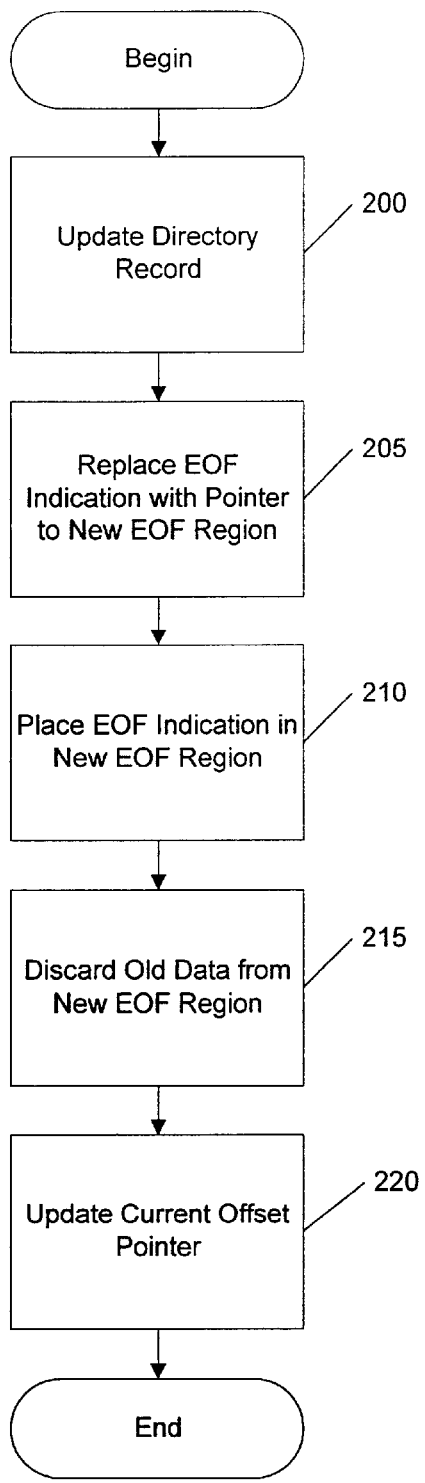
FIG. 5 is a flowchart illustrating operations for data storage according to an embodiment of the present invention.

Referring now to FIG. 5, operations for an embodiment of the redesignating operations from block 175 of FIG. 4 will be described in further detail. At block 200, the directory record 70 associated with the rolling window file is updated to replace a pointer designating the first region with a pointer designating the new first region. For example, with reference to the directory record 70 shown in FIG. 2, the pointer field 82 would be updated to point to the appropriate region number in the file allocation table 60 which is the new first region in the sequentially linked set of regions associated with the file.

In addition, the end of file indication in the file allocation table 60 associated with the end of file region is updated and replaced with a pointer to the new end of file region (block 205). Furthermore, an end of file indication is placed in the new end of file region (block 210). For example, with reference to FIG. 2 and FIG. 3, if the pointer field 84 of the directory record 70 had originally referenced to Region 02 100, the pointer field 84 would be changed to designate Region 04 104 which had previously been the second region in the linked sequential list of associated regions. Region 07 110, which had previously contained the end of file designation FFFF, would be updated and provided a pointer to the new end of file region, Region 02 100. Accordingly, a 0002 designation would be placed in pointer row 94 of Region 07 110. In addition, the new end of file Region 02 100 would be updated to replace the 0004 pointer with an FFFF end of file designation.

Referring again to FIG. 5, in addition to updating the directory record 70 and the file allocation table 60, the old data would be discarded from the new end of file region (block 215). The discarding operation may be provided by affirmatively overwriting the stored data or by simply designating the space as available, thereby allowing the old data to be overwritten by new data as the new data is stored. In addition, the current offset pointer used by the file system is updated to account for the incremental reduction in the offset caused by shifting what had previously been the first region to the end of the file (block 220). This shift in the current offset pointer accounts for the change in the pointer field 84 of the directory record 70 for subsequent operations and file storage. Accordingly, the systems and methods of the present invention as described for the embodiment illustrated in FIG. 4 and FIG. 5 provide for a simplified implementation of a rolling window file supporting collection of high speed or bursty data streams into a fixed sized file for applications such as network or software execution traces. This new file type may provide a means for supporting such applications without creating an operating system overhead which could disrupt or interrupt the actual data collection.

Figure 6:
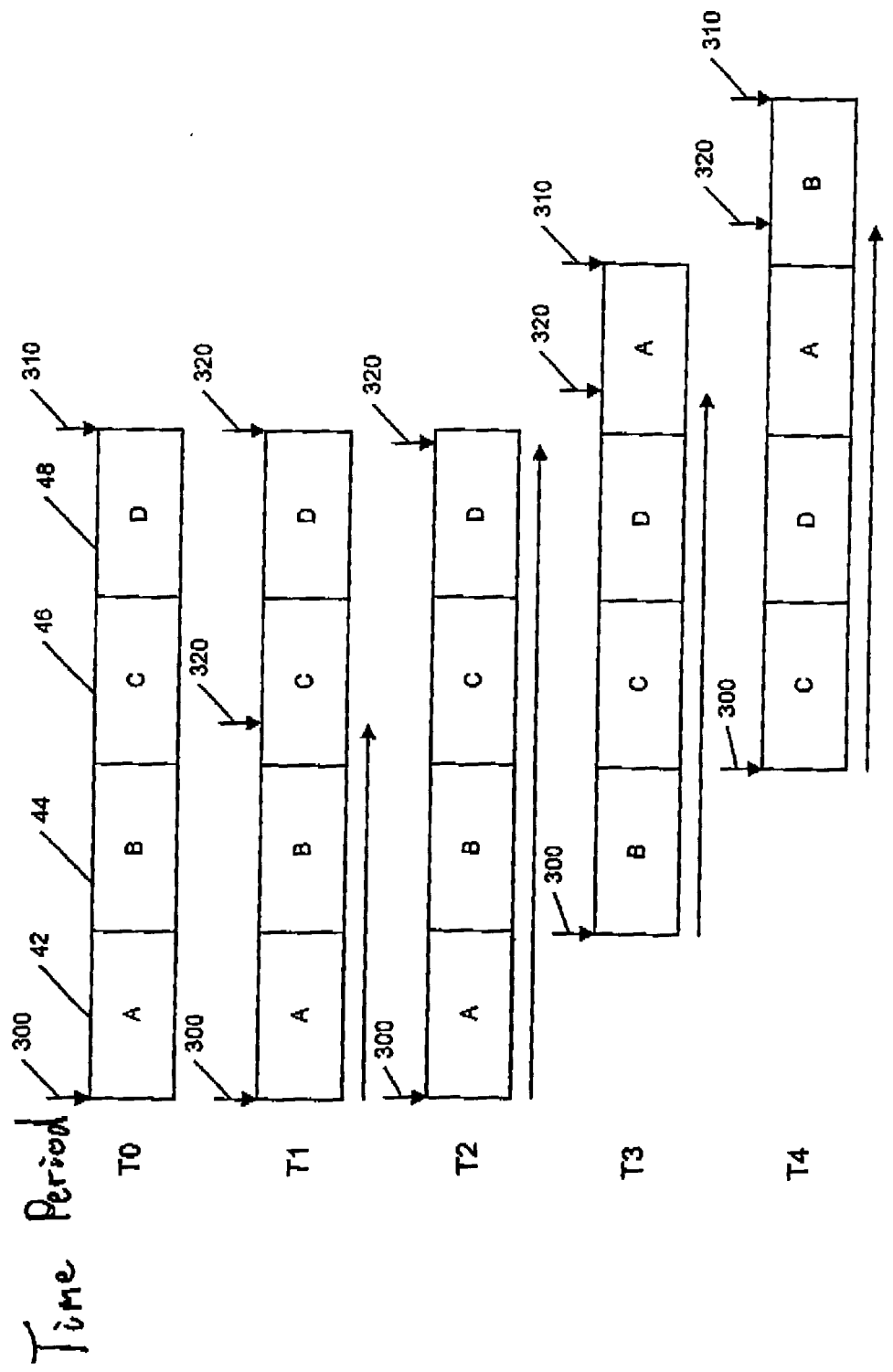
FIG. 6 is a schematic diagram illustrating data storage operations according to an embodiment of the present invention.

Referring now to FIG. 6, the present invention will be further described through reference to the schematic illustration of an illustrative embodiment of operations according to the present invention. As shown in FIG. 6, the rolling window file is originally allocated four regions designated regions A, B, C and D 42–48 which are sequentially linked in the illustrated order from A–D. The rolling window file as illustrated at time T0 may be implemented within the file system, for example, in the kernel of the operating system, using direct knowledge of file allocation structures. The file may be created with a predefined maximum size as illustrated to avoid saturating available disk storage. As will be described, during file overflow conditions, the rolling window file uses internal knowledge of the file system to resize the file in a manner which may cause virtually no performance cost. The oldest data will be discarded, on the fly, without requiring any intervention from the data collecting application program 30.

As shown at time T0 of FIG. 6, the rolling window file is originally created using an integer number of disk sectors or regions. Preferably, disk performance is improved by allocating the physical sectors at the time of creation with desirable proximities to one another and minimum fragmentation within each region 42–48.

As will now be described with reference to subsequent time periods T1–T4 of FIG. 6, a rolling window file according to the present invention rolls along under the collected data stream by moving the oldest sector to the logical end of the file each time the file overflows. At time T0 the rolling window file has been created but not used. Regions A–D, 44-48, have been allocated, typically according to some system dependent scheme for improved performance. The current offset pointer is equal to the offset zero location 300 and the end of Region D 48, is the location of the end of file pointer 310.

At time T1, the file has begun to fill. The current offset pointer 320 points to a position within the interior of Regions C 46. No file boundary overflow conditions have been encountered at time T1. At time T2, the file is essentially completely full. The current offset pointer 320 is substantially at the same location as the end of file pointer 310. Accordingly, the next attempt to write to the file under previously known file management systems and file structures without the benefits of the rolling window file of the present invention would typically result in an error code being returned in response to the request to write data.

At time T3 an additional write command requesting storage of data to the file has been submitted. However, according to the present invention, rather than returning an error condition, the file management system 10 relinks Region A 42 to make it the end of file region in the linked list of regions associated with the file. The current offset pointer 320 is updated to account for the truncation of the oldest data which had previously been stored in Region A 42. The data that was in Region A 42, which was the stalest data in the file, is discarded. The requested write successfully saves the freshest data associated with the current write request in the relinked Region A 42 which at time 43, as shown in FIG. 6, is the end of file region. By use of a rolling window file according to the present invention, the relink operation may be provided in a manner which is invisible to the application program 30 writing to the file. Unlike conventional approaches not using a rolling window file, the writing application program(s) 30 using the present invention need not keep a record of the current wrap offset, which may make the application program code simpler and avoid a host of expensive additional seek and write operations to save the offset pointer. Also, because the file system according to the present invention transparently manages the resetting of the file offset back to the beginning when overflow occurs, the application program(s) 30 does not have to keep track of how full the file is getting or seek back to the beginning on overflow. Furthermore, the reading application program(s) 30 need not understand the format of the file to parse the starting offset pointer because the oldest data is always at the beginning of the file, making it unnecessary to save the offset pointer in the file.

At time T4, the process is repeated as data collection continues as shown by the relink of Region B 44 to accommodate overflow from Region A 42. By reusing previously allocated sectors, the rolling window file according to the present invention can theoretically collect data forever without ever having to perform potentially expensive disk allocation operations during data storage events. Accordingly, as described in the embodiment of FIG. 6, the actual performance cost of a relink is to update two pointers and decrement the current offset.

Operations of the present invention have been described above with respect to the flowcharts of FIGS. 4 and 5. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagrams block or blocks. The computer program instructions may be executed by a processor to cause a series of operational steps to be performed by the processor to produce a computer implemented process such that the instructions which execute on the processor provide steps for implementing the functions specified in the flowchart and/or block diagrams block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

As will be appreciated by those of skill in this art, the above-described aspects of the present invention in the figures may be provided by hardware, software, or a combination of the above. Various components of the data storage system of the present invention may, in practice, be implemented by a microcontroller including input and output ports and running software code, by custom or hybrid integrated circuits, by discrete components or by a combination of the above. More generally, as described above, operations according to the present invention may be realized in the hardware of existing computers or other programmable devices.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for storing data in a file comprising the steps of:
associating a defined number of storage regions with the file including a first region and an end of file region;
storing data in the associated storage regions to provide an unused size of the file corresponding to a portion of the associated storage regions not containing data; and then receiving additional data;
redesignating the first region as a new end of file region; and
storing at least a portion of the additional data in the new end of file region.

2. A method according to claim 1 wherein the step of receiving additional data comprises the step of receiving an additional amount of data for storage in the file, the additional amount of data exceeding the unused size of the file.

3. A method according to claim 2 wherein the step of associating a defined number of storage regions further comprises the steps of:
creating a directory record associated with the file; and
updating the directory record to indicate that the file is a rolling window type file.

4. A method according to claim 2 wherein the step of associating a defined number of regions is preceded by the step of determining if the file is designated as a rolling window type file.

5. A method according to claim 3 wherein the step of storing data in the associated storage regions comprises the step of storing data in the associated storage regions sequentially from the first region through the end of file region and wherein the step of redesignating further comprises the step of redesignating a second region in the associated storage regions, which second region sequentially follows the first region, as a new first region.

6. A method according to claim 5 wherein the step of storing the additional data in the new end of file region is followed by the steps of:
receiving further additional data;
redesignating the new first region as a second new end of file region and a third region in the associated storage regions, which third region sequentially follows the new first region, as a second new first region; and
storing the further additional data in the second new end of file region.

7. A method according to claim 5 wherein the step of redesignating comprises the steps of:
updating the directory record associated with the file to replace a pointer designating the first region with a pointer designating the new first region; and
updating a file allocation table to replace an end of file indication in the end of file region with a pointer to the new end of file region and to place an end of file indication in the new end of file region.

8. A method for storing data in a rolling window file including a defined number of sequentially associated storage regions from a first region through an end of file region, the end of file region having an unused size, the method comprising the steps of:
receiving an amount of data for storage in the rolling window file which exceeds the unused size of the end of file region;
redesignating the first region as a new end of file region;
redesignating a second region in the associated storage regions, which second region sequentially follows the first region, as a new first region; and
storing the received data in the new end of file region.

9. A method according to claim 8 wherein the step of storing the received data is followed by the steps of:
receiving additional data for storage in the rolling window file which exceeds an unused size of the new end of file region;
redesignating the new first region as a second new end of file region and a third region in the associated storage regions, which third region sequentially follows the new first region, as a second new first region; and
storing the additional data in the second new end of file region.

10. A method according to claim 8 wherein the rolling window file is a file type supported by a file system and wherein the file system is a file allocation table based file system and the storage regions are clusters maintained by the file system.

11. A method according to claim 8 wherein the rolling window file has an associated directory record and wherein the step of redesignating comprises the steps of:

updating the associated directory record to replace a pointer designating the first region with a pointer designating the new first region; and updating a file allocation table to replace an end of file indication in the end of file region with a pointer to the new end of file region and to place an end of file indication in the new end of file region.

12. A rolling window file based system for storing data, the system comprising:

means for associating a defined number of storage regions with a rolling window file including a first region and an end of file region;

means for receiving data for storage;

means for storing received data in the associated storage regions to provide an unused size of the file corresponding to a portion of the associated storage regions not containing data; and means responsive to receipt of additional data exceeding the unused size of the file for redesignating the first region as a new end of file region and for storing the additional data in the new end of file region.

13. A system according to claim 12 wherein the means for associating a defined number of storage regions further comprises:

means for creating a directory record associated with the file; and means for updating the directory record to indicate that the file is a rolling window type file.

14. A system according to claim 12 wherein the means for storing received data in the associated storage regions comprises means for storing received data in the associated storage regions sequentially from the first region through the end of file region and wherein the means for redesignating further comprises means for redesignating a second region in the associated storage regions, which second region sequentially follows the first region, as a new first region.

15. A system according to claim 14 wherein the means for redesignating comprises:

means for updating a directory record associated with the file to replace a pointer designating the first region with a pointer designating the new first region; and means for updating a file allocation table to replace an end of file indication in the end of file region with a pointer to the new end of file region and to place an end of file indication in the new end of file region.

16. A system according to claim 15 wherein the rolling window file is a file type supported by a file system and wherein the file system is a file allocation table based file system and the storage regions are clusters maintained by the file system.

17. A system for storing data comprising:

a rolling window file including a defined number of sequentially associated regions from a first region through an end of file region, the end of file region having an unused size;

means for receiving an amount of data for storage in the rolling window file which exceeds the unused size of the end of file region;

means for redesignating the first region as a new end of file region;

means for redesignating a second region in the associated storage regions, which second region sequentially follows the first region, as a new first region; and means for storing the received data in the new end of file region.

18. A system according to claim 17 wherein the rolling window file is a file type supported by a file system and wherein the file system is a file allocation table based file system and the storage regions are clusters maintained by the file system.

19. A system according to claim 18 wherein the rolling window file has an associated directory record and wherein the means for redesignating comprises:

means for updating the associated directory record to replace a pointer designating the first region with a pointer designating the new first region; and means for updating a file allocation table to replace an end of file indication in the end of file region with a pointer to the new end of file region and to place an end of file indication in the new end of file region.

20. A computer program product for storing data, the computer program product comprising:

a computer-readable storage medium having computer-readable program code means embodied in said medium, said computer-readable program code means comprising:

computer readable program code means for associating a defined number of storage regions with a rolling window file including a first region and an end of file region;

computer readable program code means for receiving data for storage;

computer readable program code means for storing received data in the associated storage regions to provide an unused size of the file corresponding to a portion of the associated storage regions not containing data; and computer readable program code means responsive to receipt of additional data exceeding the unused size of the file for redesignating the first region as a new end of file region and for storing the additional data in the new end of file region.

21. A computer program product according to claim 20 wherein the computer readable program code means for storing received data in the associated storage regions comprises computer readable program code means for storing received data in the associated storage regions sequentially from the first region through the end of file region and wherein the computer readable program code means for redesignating further comprises computer readable program code means for redesignating a second region in the associated storage regions, which second region sequentially follows the first region, as a new first region.

22. A computer program product according to claim 21 wherein the computer readable program code means for redesignating comprises:

computer readable program code means for updating a directory record associated with the file to replace a pointer designating the first region with a pointer designating the new first region; and computer readable program code means for updating a file allocation table to replace an end of file indication in the end of file region with a pointer to the new end of file region and to place an end of file indication in the new end of file region.

23. A computer program product according to claim 22 wherein the rolling window file is a file type supported by a file system and wherein the file system is a file allocation table based file system and the storage regions are clusters maintained by the file system.

24. A computer program product for storing data in a rolling window file including a defined number of sequentially associated regions from a first region through an end of file region, the end of file region having an unused size, the computer program product comprising:

a computer-readable storage medium having computer-readable program code means embodied in said medium, said computer-readable program code means comprising:

computer readable program code means for receiving an amount of data for storage in the rolling window file which exceeds the unused size of the end of file region;

computer readable program code means for redesignating the first region as a new end of file region;

computer readable program code means for redesignating a second region in the associated storage regions, which second region sequentially follows the first region, as a new first region; and computer readable program code means for storing the received data in the new end of file region.

25. A computer program product according to claim 24 wherein the rolling window file is a file type supported by a file system and wherein the file system is a file allocation table based file system and the storage regions are clusters maintained by the file system.

26. A computer program product according to claim 25 wherein the rolling window file has an associated directory record and wherein the computer readable program code means for redesignating comprises:

computer readable program code means for updating the associated directory record to replace a pointer designating the first region with a pointer designating the new first region; and computer readable program code means for updating a file allocation table to replace an end of file indication in the end of file region with a pointer to the new end of file region and to place an end of file indication in the new end of file region.

\* \* \* \* \*